United States Patent
Gilles

(10) Patent No.: US 8,766,133 B2
(45) Date of Patent: Jul. 1, 2014

(54) PROCESS FOR HIGH-ENERGY DENSITY BEAM WELDING

(75) Inventor: Thomas Gilles, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 538 days.

(21) Appl. No.: 12/412,588

(22) Filed: Mar. 27, 2009

(65) Prior Publication Data

US 2009/0261079 A1 Oct. 22, 2009

(30) Foreign Application Priority Data

Apr. 9, 2008 (FR) ...................................... 08 52366

(51) Int. Cl.
*B23K 15/00* (2006.01)
(52) U.S. Cl.
USPC ..................................... 219/121.14; 428/593
(58) Field of Classification Search
USPC ............. 219/121.14, 121.46, 121.13, 121.63, 219/121.64, 121, 117.1, 121.12, 121.35, 219/121.6, 121.72, 121.81, 121.85, 121.78, 219/121.76; 156/272.8, 306.6, 220, 60, 156/196, 242; 428/636, 680, 659, 615, 653, 428/204, 304.4, 593
See application file for complete search history.

(56) References Cited

U.S. PATENT DOCUMENTS

| | | | |
|---|---|---|---|
| 4,175,226 A * | 11/1979 | Kappelsberger et al. ........................ | 219/121.14 |
| 4,603,089 A * | 7/1986 | Bampton ....................... | 428/593 |
| 4,642,446 A * | 2/1987 | Pennington .............. | 219/121.64 |
| 5,371,337 A * | 12/1994 | Campbell et al. ......... | 219/121.63 |
| 2003/0108767 A1* | 6/2003 | Feng et al. ..................... | 428/680 |
| 2004/0000539 A1* | 1/2004 | Takikawa et al. ......... | 219/121.64 |
| 2005/0211687 A1 | 9/2005 | Sonoda et al. | |
| 2006/0169748 A1* | 8/2006 | Ezumi et al. ............... | 228/112.1 |

FOREIGN PATENT DOCUMENTS

| | | |
|---|---|---|
| DE | 24 23 577 A1 | 11/1974 |
| JP | 51 055746 A | 5/1976 |
| JP | 02 151374 A | 6/1990 |
| JP | 02 251390 A | 10/1990 |
| JP | 09 108848 A | 4/1997 |
| WO | 2005/102591 A | 11/2005 |

* cited by examiner

*Primary Examiner* — Henry Yuen
*Assistant Examiner* — Phuong Nguyen
(74) *Attorney, Agent, or Firm* — Ingrassia Fisher & Lorenz P.C.

(57) ABSTRACT

A high-energy density beam welding process for two panels includes a step that include placing a metal band on the upper face of at least one panel, in the axis of the desired welded joint before welding the panels, so that the metal band is inserted between the panels and the high-energy density beam during the welding step, and so that the thickness of this metal band integrates all of the geometric faults present on the surface of the welded joint.

5 Claims, 2 Drawing Sheets

PROCESS FOR HIGH-ENERGY DENSITY BEAM WELDING

BACKGROUND

1. Field

The disclosed embodiments concern a process for high-energy density beam welding two panels mounted plane to plane (transparent) or edge to edge.

2. Brief Description of Related Developments

In many industrial fields, such as the field of aeronautics or automobiles, it is known how to use a high-energy density beam welding process to join two pieces over limited assembly areas. This process of fusion welding some of the materials being assembled makes it possible, because of the localized deposit of energy, to involve only a relatively small volume of melted, thermally affected zones. During the welding operation, the energy concentrated on the panels being welded is intense enough to vaporize the metal directly under the beam, which creates a "keyhole," also called a capillary. The walls of the capillary are made of fused liquid metal. The metallic bath created and maintained in this way is moved along the pieces being assembled. The fusion metal resolidifies after the beam passes by, ensuring that the pieces are assembled.

FIGS. 1 and 2 of the state of the art show part of the high-energy density welding device in the step of transparent welding of two panels mounted plane to plane (FIG. 1) and a cross section of those two panels connected by the welded joint obtained (FIG. 2).

As can be seen in FIG. 1, to join a top panel 1 to a bottom panel 1, the bottom face 3 of the top panel 1 is mounted to the top face 4 of the bottom panel 2, in the position where it is desired to join the panels 1 and 2. Top means facing the welding device 20, as opposed to bottom. A high-energy density beam 21, such as a laser beam or an electron beam, is applied and moved, for example, longitudinally, in the area of overlap 5 of the panels 1, 2 so as to obtain a welded joint 6 after solidification of the mixture of fused metal of the two panels 1 and 2. As the beam 21 moves, the melting metal located upstream from said beam 21 cools and solidifies to form the welded joint.

As can be seen in FIG. 2, in the case of a capillary opening up, i.e., going through the total thickness of the two panels, the welded joint 7 obtained has a bottom protuberance 8 projecting over the bottom face 9 of the lower panel 2, which can easily be eliminated after the welding step, by sanding, for example. Thickness means the dimension of the panels extending vertically in relation to the plane of the panels. Similarly, a top protuberance 10 projecting from the top face 11 of the upper panel 1 is often obtained, and it can easily be eliminated, once the welding step is finished.

However, the upper protuberance 10, in the axis of the beam 21 is formed, depending on the edges of said metallic bath, so that this upper protuberance 10 is bordered longitudinally by two undercuts 12 or grooves. These undercuts 12 consist of a lack of localized material and extend parallel to the trajectory of the beam 21.

Currently, to eliminate the undercuts obtained on the upper surface of the welded joint, it is known, before the welding step, by a high-energy density process, to machine a reinforcement on the top face of the panel or panels located in the incidence of the beam, so as to locate the undercuts in this reinforcement, which will then be finished.

It is also known from document US2005/0211687 how to increase the volume of the metallic bath by adding metal in the form of wire. However, to do that, it is necessary to use a special mechanism with a motorized wire reel at the head of the beam and to couple it to the speed of advancement of the laser device, which makes the device and using it complex.

SUMMARY

The aspects of the disclosed embodiments attempt to make a welded joint between two plates mounted plane to plane (transparent) or edge to edge, by an easy-to-use high-energy density welding process that makes it possible to obtain smooth surfaces in the end, i.e., with no geometric faults.

To do so, the aspects of the disclosed embodiments propose placing a strip in the trajectory of the high-energy density beam before doing the welding per se, so that the strip is inserted between the top panel or panels and the welding head in the whole area normally affected by the formation of poor alignment [of plate edges]. Thus, the undercuts are no longer dug into the material forming the panel or panels, but in the material forming the strip, and said strip can easily be finished after the welding step so as to obtain a plane welded joint surface, with no geometric accidents. The parts of the strip that do not melt during the welding step are deformed and easily eliminated because they are not very thick. Compared to the prior art, the aspects of the disclosed embodiments have the advantage of eliminating the cost of a machining operation on the panel or panels and/or of specific equipment, and is much simpler to use.

The subject of the disclosed embodiments is therefore a high-energy density beam welding process for two panels, characterized by the fact that it includes the step that consists of having a metal band on the top surface of at least one panel, in the axis of the desired welded joint, before welding said panels, with the metal band inserted between the panels and the high-energy density beam during the welding step, so as to integrate the geometric faults present on the top face of a piece or pieces.

Generally, top is understood as pointing toward the beam, in contrast to bottom. Welded joint is understood as the volume of melted metal that solidifies after the passage of the beam to form a mechanical connection between the pieces to be assembled.

The metal band or strip is made of a material that is metallurgically compatible with the material or materials of the panels being welded.

The aspects of the disclosed embodiments apply both to plane to plane (transparent) welding and edge-to-edge welding of two plates.

In the case of edge-to-edge welding, it is possible to provide for the metal band to cover a mounting area located on either side of the two mounted edges of the two panels. The mounting area extends over the whole length of the mounted edges. Length is understood as the size of the panels extending in the axis of the beam, and hence of the welded joint.

In the case of plane-to-plane (transparent) welding, it is possible to arrange the metal band so that it extends into a mounting area of said panels, before or after the two panels are mounted plane to plane. The mounting area is understood to be the area of overlap of the two panels, i.e., where the two panels are superimposed.

Advantageously, the metal band is jointed to at least one panel before the step of welding the panels, so that it remains fixed on the panel or panels as the beam advances. The joining can be done by any known means, for example by tack welding by condenser discharge, by TiG, by glass-bead blasting, pliers, spring clips, etc.

Preferably, a metal band between 50 µm and 2 mm thick will be chosen.

Thickness is understood as the size of the metal band extending vertically between the plates being welded and the welding beam. For example, before welding the plates, gradations are made on samples with the characteristics of the plates being welded, from the standpoint of materials and thickness, so as to identify the smallest thickness of the metal band that can be used for the welding process and can contain all the geometric faults. Indeed, if the metal band is not thick enough, the undercuts will be located within the total thickness of the metal band, but also within a partial thickness of the panel or panels being welded, which is not desirable.

Similarly, it is preferable to choose a metal band with a width strictly greater than the width of the welded joint expected.

Width of the metal band is understood as the dimension extending horizontally and transversely to the axis of the welding beam. Similarly, width of the welded joint is understood as the dimension extending horizontally and transversely to the axis of the welding beam, on both sides of the movement of material caused by the advance of the welding beam. Here again, the adequate width of the metal band can be determined by tests done on samples with the characteristics of the plates to be welded, from the standpoint of the materials and the thickness, that are welded without a metal band so as to measure the width of the welded joint obtained.

Once the welding step is over, it is possible to finish the top face of the welded panels, so as to obtain a plane top surface of the welded joint.

This step makes it possible to eliminate all of the irregularities or faults that may remain by any known means.

BRIEF DESCRIPTION OF THE DRAWINGS

The aspects of the disclosed embodiments will be better understood by reading the following description and examining the accompanying figures, which are submitted for purposes of information and are in no way limiting.

DETAILED DESCRIPTION OF THE DISCLOSED EMBODIMENTS

Figure 1:
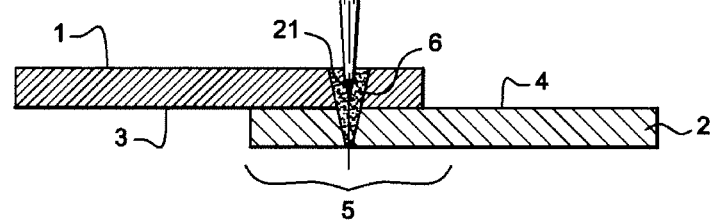
FIG. 1 shows a schematic cross sectional view of a high-energy density welding device in the process of welding two plates mounted plane to plane, by a state-of-the-art process already described.
Figure 2:
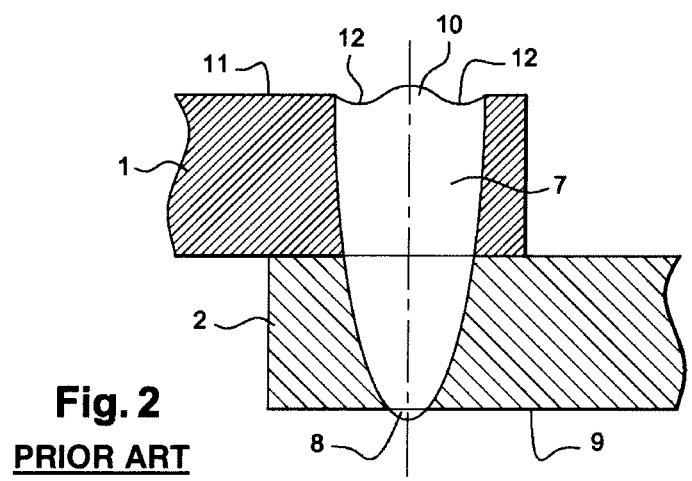
FIG. 2 shows a cross sectional view of two plates mounted plane to plane at a welded joint obtained by a state-of-the-art process already described.
Figures 3, 4:
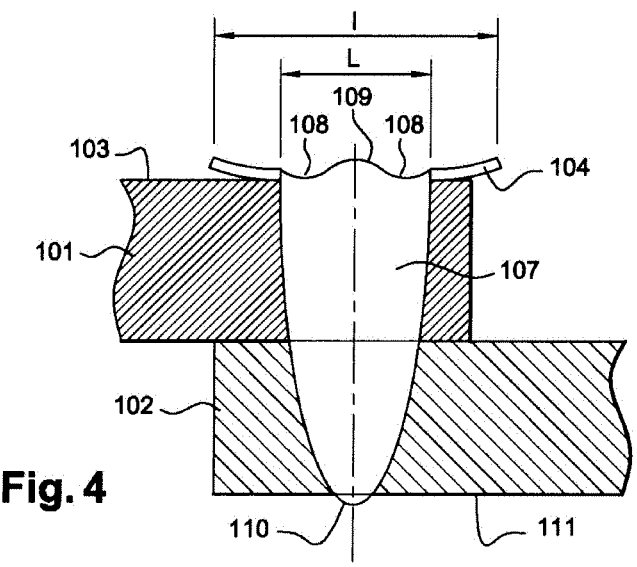
FIG. 3 shows a cross sectional schematic view of a high-energy density welding device in the process of welding two plates mounted plane to plane, by a process in conformity with the disclosed embodiments.
FIG. 4 shows a cross sectional view of two plates mounted plane to plane at the welded joint obtained by the welding process in the disclosed embodiments.

As is visible in FIG. 3, one top face 103 of an upper panel 100 is partly covered with a metal band 104 in the overlap area 105, between the upper panel 101 and the lower panel 102 to which it must be welded.

The metal band 104 extends in the axis of the welding beam 100, i.e., along the trajectory of the welded joint that one wishes to obtain. The metal band 104 is thus inserted between the upper face 103 of the top panel 101 and the beam 100, so that the material of the metal band 104 includes the geometric faults made on the surface of the welded joint.

For example, the two panels 101, 102 and the metal band 104 can be in different grades of materials, exclusively to the extent that those two materials are compatible from a metallurgical standpoint.

Before the welding step, the panels 101, 102 are mounted in the position in which said two panels 101, 102 should be maintained after the welding step.

Advantageously, the width I of the metal band 104 is strictly greater than the width of the metal bath 106 obtained when the beam 100 is moved and hence than the width L of the welded joint 107 obtained after the bath 106 cools (FIG. 4). Metal bath 106 is understood as the volume of fusion material created locally by the application of the welding beam 100 to the pieces to be welded. In other words, the width I of the metal band 104 is chosen so as to overlap the area affected by the formation of undercuts 108.

FIG. 4 shows a cross section of plates 101 and 102, at the welded joint 107, obtained by the high-energy density beam welding process in the disclosed embodiments.

After the passage of the welding beam 100, it is possible to see the creation of an upper protuberance 109 and undercuts 108 bordering the upper protuberance 109 on the upper face of the welded joint 107. The dimensions of said undercuts 108 are entirely included in the metal band 104 mounted so that once said metal band is withdrawn, the upper faces of the welded joint 107 and the upper plate 101 are mixed and perfectly smooth. Dimensions of the undercuts are understood to be the depth, the width and the length. Depth is understood as the dimension of the undercuts extending vertically in relation to the plane of the panels; length is understood as the dimension of the undercuts extending parallel to the axis of the welded joint; width is understood as the dimension of the undercuts extending between the two longitudinal rims of the undercuts.

In the example shown in FIG. 4, the welded joint is transverse, but the welding process in the disclosed embodiments could just as well be done so as to obtain a non-transverse welded joint, i.e., not opening onto the lower face 111, so that there is no lower protuberance 110 to be finished after the welding step.

Similarly, the welding process can be applied to welding two plates edge to edge, with the metal band then located in the area where the two plates are mounted so as to cover the two edges mounted.

What is claimed is:

1. A process for welding two panels comprising:
providing at least a top panel having an upper face opposite a lower face, the upper face adjacent to a welding beam;
providing a separate metal band;
placing the separate metal band on the upper face of the top panel so that the metal band is disposed entirely above the upper face of the top panel, along an axis of a desired welded joint, before welding said panels, so that the metal band is inserted between the welding beam and the panels; and
after placing the metal band along the axis of the desired welded joint, joining the metal band to the upper face of the top panel so that the metal band remains fixed on the upper face of the top panel and welding the two panels together where at least a portion of the metal band forms part of the welded joint after the welding process;
wherein said process is an edge-to-edge welding process, with the metal band being placed so as to overlap a mounting area located on both sides of two mounted edges of the two panels;
wherein the metal band has a width greater than the width of the desired welded joint.

2. The process as claimed in claim 1, further comprising that said process is a plane-to-plane welding process, with the metal band placed on the at least one top panel before mounting the two panels plane to plane, so that the metal band extends into a mounting area of said panels.

3. The process as claimed in claim 1, further comprising that said process is a plane-to-plane welding process, with the metal band placed on the at least one top panel after having mounted the two panels plane-to-plane, so that the metal band extends into a mounting area of said panels.

4. The process as claimed in claim 1, wherein the metal band has a thickness between 50 μm and 2 mm.

5. The process as claimed in claim 1, further comprising finishing the upper face of the welded panels so as to obtain a plane surface after welding the two panels together.

\* \* \* \* \*